US006865245B2

(12) United States Patent
Bazant

(10) Patent No.: US 6,865,245 B2
(45) Date of Patent: Mar. 8, 2005

(54) GUIDE RING TO CONTROL GRANULAR MIXING IN A PEBBLE-BED NUCLEAR REACTOR

(75) Inventor: Martin Z. Bazant, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/264,098

(22) Filed: Oct. 3, 2002

(65) Prior Publication Data

US 2004/0066875 A1 Apr. 8, 2004

(51) Int. Cl.⁷ .............................................. G21C 19/28
(52) U.S. Cl. ....................... 376/381; 376/382; 376/265
(58) Field of Search ................................ 376/381, 382, 376/265, 266, 359, 361, 366, 338, 332, 220, 221, 292, 294

(56) References Cited

U.S. PATENT DOCUMENTS

| | | | | |
|---|---|---|---|---|
| 2,975,116 A | * | 3/1961 | Farrington | 376/171 |
| 3,132,997 A | * | 6/1962 | Busey | 176/40 |
| 3,170,843 A | * | 10/1962 | Hammond | 176/18 |
| 3,297,538 A | * | 1/1967 | Grumm et al. | 376/265 |
| 3,321,376 A | * | 5/1967 | Machnig et al. | 376/381 |
| 3,347,747 A | * | 10/1967 | West et al. | 376/230 |
| 4,642,214 A | * | 2/1987 | Zhong | 376/221 |
| 4,789,519 A | * | 12/1988 | Schoening et al. | 376/381 |
| 5,017,333 A | * | 5/1991 | Hayashi et al. | 376/382 |
| 5,037,601 A | * | 8/1991 | Dauvergne | 376/172 |
| 5,106,574 A | * | 4/1992 | El-Genk et al. | 376/382 |
| 5,225,153 A | * | 7/1993 | Yamada et al. | 376/381 |
| 5,774,514 A | * | 6/1998 | Rubbia | 376/193 |

FOREIGN PATENT DOCUMENTS

GB      821607      * 10/1959

OTHER PUBLICATIONS

Merriam–Webster's Collegiate Dictionary, Tenth Edition, Springfield, MA, p. 780.*
David Talbot, "The Next Nuclear Plant", *Technology Review*, Jan./Feb. 2992, http://www.technologyreview.com/article/print version/talbot0102.asp., pgs. 1–6.

* cited by examiner

Primary Examiner—Michael J. Carone
Assistant Examiner—Rick Palabrica
(74) Attorney, Agent, or Firm—Robert J. Sayre, Esq.; Mintz, Levin, Cohn, Ferris, Glovsky, & Popeo, P.C.

(57) ABSTRACT

A guide ring is positioned in the reactor core vessel of a pebble-bed nuclear reactor to segregate fuel pebbles and reflector pebbles fed into the vessel through respective conduits. The reflector pebbles pass through the guide ring and form a central reflector column, while the fuel pebbles pass outside the guide ring and form an annular fuel column surrounding the central reflector column. The guide ring controls the size and shape of the reflector column and controls mixing of the two types of pebbles.

18 Claims, 4 Drawing Sheets

GUIDE RING TO CONTROL GRANULAR MIXING IN A PEBBLE-BED NUCLEAR REACTOR

BACKGROUND

In the context of the various advantages and drawbacks of existing energy sources and the ongoing quest to find a "better" (i.e., safer, less-polling, more-efficient, less-expensive, etc.) energy source, interest is growing in a developing nuclear technology involving gas-cooled, "pebble-bed" nuclear reactors. Recent streamlining of the regulatory structure for obtaining nuclear-reactor construction and operating licenses along with new government plans for funding the research and development of promising nuclear-reactor designs further fuel this interest.

Pebble-bed nuclear reactors offer substantial promise and many advantages over conventional liquid-cooled nuclear reactors. Like current commercial liquid-cooled reactors, which produce about 20 percent of U.S. electricity, a pebble bed reactor uses uranium as its power source. Under the right conditions, uranium atoms split, or "fission," throwing off energetic neutrons and other particles that break up still more uranium atoms in a chain reaction that generates enormous amounts of heat. In liquid-cooled reactors, the heat boils water to create steam to drive turbines and create electricity. In a gas-cooled pebble bed reactor, the nuclear reactions heat helium gas, which spins turbines as it expands.

Compared to standard liquid-cooled nuclear reactors, gas-cooled pebble-bed reactors promise to be safer, cleaner, more-quickly built, cheaper to build and operate, smaller and more efficient. Gas-cooled pebble-bed reactors can be built and safely operated without needing a containment dome, and they can be operated at higher, more-efficient temperatures than liquid-cooled reactors.

A small 15 Megawatt-electric, high-temperature, helium-cooled pebble-bed reactor with a core consisting of uranium-laced graphite fuel pebbles has been successfully operating for more than 20 years in Germany. The basic principles of this reactor are being revisited today with several new designs, which are more powerful, bigger, and yet modular (i.e., can be easily assembled and taken apart). These new reactors may have a major impact on power generation in the not-so-distant future, in the United States and around the world.

The first of the new breed will be the 125 Megawatt Pebble-Bed Modular Reactor (PBMR), currently being built in South Africa by the PBMR consortium led by ESKOM. At the same time, Massachusetts Institute of Technology and the United States Department of Energy's Idaho National Environmental Engineering Laboratory are also working to develop similar technology in the United States, as part of the Modular Pebble-Bed Reactor (MPBR) research project.

Pebble-bed reactors are continuously refueled by slowly cycling radioactive fuel pebbles, which resemble billiard balls, through the reactor core. Altogether, there about 360,000 pebbles in the core. One pebble is discharged from the bottom of the reactor about every 30 seconds, and an average pebble is cycled through the core 15 times before being discarded. The fuel pebbles are believed to be immune to the "worst-case" nuclear-reactor scenario (i.e., a loss of coolant in the reactor core that would lead to a melting of the uranium fuel and a catastrophic release of radiation) because the graphite in the pebbles which encase the uranium cannot get hot enough to melt. This graphite encasement may also make the spent fuel pebbles more rugged and more resistant to corrosion in long-term storage.

In the German reactor, all pebbles in the core are identical. A novel feature of the PBMR (and the MPBR), however, is the use of two different kinds of pebbles: the usual fuel pebble (i.e., a 60 mm graphite sphere containing, e.g., about 11,000 micro-spheres of coated uranium dioxide) and a pure graphite "reflector pebble" of nearly identical size, weight, and surface roughness. The graphite reflector pebbles, like the graphite lining of the reactor, reflect and slow the uranium's neutrons to moderate the energy-producing fission process.

Each of the uranium-dioxide micro-spheres in the fuel particles is typically about 0.5 mm in diameter and is coated with a layer of porous carbon, a layer of high-density pyrolitic carbon, a layer of silicon carbide, and then another layer of high-density pyrolitic carbon. The silicon carbide layer is sufficiently dense that no radiologically significant quantities of gaseous or metallic fission products are released from the fuel elements at temperatures up to 1,650° C.; this temperature range exceeds far beyond the normal operating temperature (about 1,200° C.) of a reactor and is further believed to exceed the core temperature response that would arise from a loss of forced cooling in the reactor.

To provide a self-sustaining reaction, the uranium of the uranium-oxide is enriched to provide about 8% U-235, which is the isotope of uranium that undergoes the fission reaction. The encapsulation of the uranium-oxide micro-spheres also reduces or eliminates any risk that they might otherwise pose as a resource for weapons proliferation, which is low to begin with due to the relatively low concentration of U-235.

As shown in the left panel of FIG. 1, the reflector pebbles 10 are fed through a drop-hole at the end of a central conduit 12 into a reactor core vessel 14. The central conduit 12 leads to a drop hole at the approximate center of the ceiling 15 of the reactor vessel 14, though the central conduit 12 (or set of such conduits) need not enter the ceiling precisely at the center. The reactor core vessel 14 is a cylinder encased in walls of reflecting graphite blocks. Within the reactor core vessel 14, under normal operating conditions, the reflector pebbles 10 fill a central reflector column 16 on the axis of the reactor core vessel 14. Meanwhile, fuel pebbles 18 are fed through drop-holes at the ends of a plurality of peripheral conduits 20 passing through the ceiling 15 of the reactor core vessel 14. Within the reactor core vessel 14, under normal operating conditions, the fuel pebbles 18 form an annular fuel column 22 between the column 16 of reflector pebbles 10 and the outer vessel wall.

The pebbles 10, 18 slowly flow downward through the reactor core vessel 14 to the sorter 26 at its exit. The sorter 26 sorts the reflector pebbles 10 from the fuel pebbles 18 as they exit the vessel 14 and typically redirects the pebbles 10, 18 back to the top of the vessel 14 through conduits 12 and 20 by applying a pressure differential. The sorter 26 further identifies spent fuel pebbles 28, which it removes from circulation, and introduces fresh fuel pebbles 30 to replace the spent fuel pebbles 28.

Within the reactor core vessel 14, the central reflector column 16 and the annular fuel column 22 do not share a distinct boundary as mixing of the reflector pebbles 10 and fuel pebbles 18 occurs in what is referred to as an annular mixed column 24 between the central reflector column 16 and annular outer column 22. The mixed column 24 is not directly controlled. Instead, it arises spontaneously through complicated dynamical processes occurring at the upper surface 34 below the drop holes in the ceiling 15 as well as in the subsurface region 16, 22, 24 of bulk granular flow toward the sorter 26.

The graphite reflector pebbles 10 in the central column 16 help to moderate the nuclear chain reactions in the core vessel 14 by slowing neutrons released from the fuel pebbles 18 and reflecting them back into the fuel column 22 where they can cause more fission events and thus sustain the reaction. In this process, the graphite does not itself undergo any nuclear fission reactions; it simply redirects the neutrons and absorbs some of their kinetic energy. The moderating function of the graphite reflector pebbles 10 is also performed by the graphite lining of the fuel pebbles 18 as well as by the graphite blocks which form the outer wall of the core vessel 14.

The special purpose of the central reflector column 16, as a carefully placed moderator, is to flatten the neutron flux profile of the reactor vessel 14. In the PBMR and MPBR, the core vessel 14 is roughly 3.5 m in diameter (larger than the German reactor core), and were it filled only with fuel pebbles 18, the central region would experience much larger fluxes than the outer region. This would lead to non-uniform burning and, given the size of the reactor, could make controlling the reaction more difficult. The central reflector column 16 of reflector pebbles 10 thus allows for greater fuel efficiency and more-uniform burning.

In a conventional liquid-cooled reactor, control over the neutron-flux profile can be achieved by inserting graphite rods into the core. In a pebble-bed reactor, however, it is not practical to introduce such rods because the granular material in the core resists penetration like a hard solid, even while it is slowly draining. In the PBMR and MPBR designs, the central column of graphite pebbles 16 thus circumvents this difficulty by mimicking the effect of a solid graphite rod in a conventional liquid-cooled reactor.

In practice, the fuel pebbles and reflector pebbles mix to some degree within the reactor. However, until recently there was no in-depth scientific understanding of the statistical dynamics of this type of granular mixing, particularly during very slow drainage. Accordingly, no reliable theories existed for answering even some of the simplest questions about this type of drainage. For example, little was known in detail about any of the following phenomena: how the flow rate changes as a function of hole diameter and other properties of the system; the extent of bulk-particle mixing during granular drainage; whether the mixing is diffusive, and if so, its local diffusion coefficient; and the dependence of mixing on particle properties, such as the size, shape, mass, and roughness of the particles.

During operation of the nuclear reactor, the width of the central graphite column must be carefully determined and controlled. If the column is too wide, then the power output of the reactor is overly reduced. On the other hand, if it is too narrow, the neutron flux distribution is overly non-uniform, leading to inefficient fuel burnup. Moreover, the peak neutron flux could exceed fuel temperature limits.

In current PBMR and MPBR designs, the relative sizes of the graphite reflector column 16 and the fuel column 24 are determined by the placement (in advance) of different dropping points for pebbles at the top of the core vessel (where the various conduits 12, 20 enter the ceiling 15 of the reactor vessel 14)). These dropping points cannot be moved, so the steady-state composition of the core cannot be changed once the reactor is built and in operation. Moreover, it is difficult to accurately predict the precise composition of the core, in particular the structure of the mixed column 24, in advance using only approximate model calculations. The existing designs therefore relied upon approximate model calculations, rather than empirical observation, to optimize the composition, and once the reactor is built, the core composition cannot ordinarily be adjusted to improve power efficiency or to control peak temperatures. This also limits the flexibility to use different types of fuel pebbles because the power distribution cannot be reshaped to conform to new fuel characteristics and limitations, once the reactor is built.

SUMMARY

The concerns and drawbacks outlined above can be addressed by the guide ring apparatus of this disclosure.

The difficulty in predicting and controlling the pebble composition of the core is that it arises dynamically from the very complicated and poorly understood process of slow granular drainage from a silo. Although some simple and reasonably successful continuum models exist for the mean velocity, there is no mathematical model which correctly predicts velocity fluctuations and particle mixing.

Experiments now show that remarkably little mixing occurs in the bulk of the reactor core vessel, well below the free surface of the pebble bed and well above the vessel opening where the pebbles drain out of the vessel. The results of these experiments stand in stark contrast to the only previously existing mathematical models of drainage, all based on the idea of "diffusing voids" rising up from the opening.

This theoretical mystery, however, can be explained by the new idea that locally correlated particle motion is caused by the upward diffusion of extended "spots" of slight excess interstitial volume. The experiments have confirmed the basic predictions of the spot model. It is becoming clear from this research that bulk mixing in the reactor is small enough to cause pebbles to deviate from the streamlines of the mean flow by at most a few pebble diameters during a passage through the entire core. Similar results have also recently been obtained in experiments on scaled-down models of the reactor core, where it is observed that particles in the bulk region deviate very little from the streamlines of the mean flow.

Consequently, the only significant source of mixing is at the free surface of the pebble bed. In the above-described PBMR/MPBR design (illustrated in FIG. 1), intermittent avalanches of pebbles 10, 18 cascade down the sides of conical piles to maintain a certain average angle of repose. Avalanches from adjacent piles at the free surface collide and mix the different types of pebbles to produce a diffuse interface 34, which propagates downward with the flow. Simple experiments show that this effect can produce an annular mixed layer of fuel and reflector pebbles 18, 10, which is at least several pebbles wide. This mixed layer near the surface is then translated downward with little additional diffusion, as explained above, thus forming an annular mixed column 24 during the slow drainage flow. Were it not for the surface mixing, however, the interface could in principle be made very sharp, with roughness only at the scale of a single particle.

This mixing at the free surface can be reduced or eliminated in pebble-bed nuclear reactors, such as those described in this disclosure, by a guide ring mounted within the reactor core vessel. Reflector pebbles are fed through a central conduit into the reactor core vessel and through the zone defined by the guide ring. Radioactive fuel pebbles are fed through one or more peripheral conduits into the reactor core vessel outside the zone defined by the guide ring.

The guide ring can be approximately cylindrical and should extend down at least to the free surface of the pebble bed in the reactor core vessel such that the fuel pebbles and reflector pebbles flow through the reactor in an annular fuel column and a central reflector column, respectively. Because very little granular mixing occurs beneath the free surface of the pebble bed, the use of the guide ring can provide a distinct boundary between the fuel column and reflector column throughout the reactor core vessel. Further the cross-sectional area of the guide ring can be adjustable, or a plurality of nested guide rings can be provided to enable dynamic adjustment of the respective cross sections of the two columns (all sections cited herein being measured in a plane perpendicular to the axis of the reactor core vessel).

The adjustable guide ring can essentially eliminate pebble mixing and can give unprecedented control over the core composition (and thus the fuel efficiency, safety, and power output) of a pebble-bed reactor that uses two or more different kinds of pebbles. This guide ring is simple, safe and inexpensive to implement and therefore offers wide applicability in pebble-bed nuclear reactors, particularly in view of the possibly significant benefits in performance, power variability and flexibility to use different types of fuel in the same reactor vessel.

Figure 1:
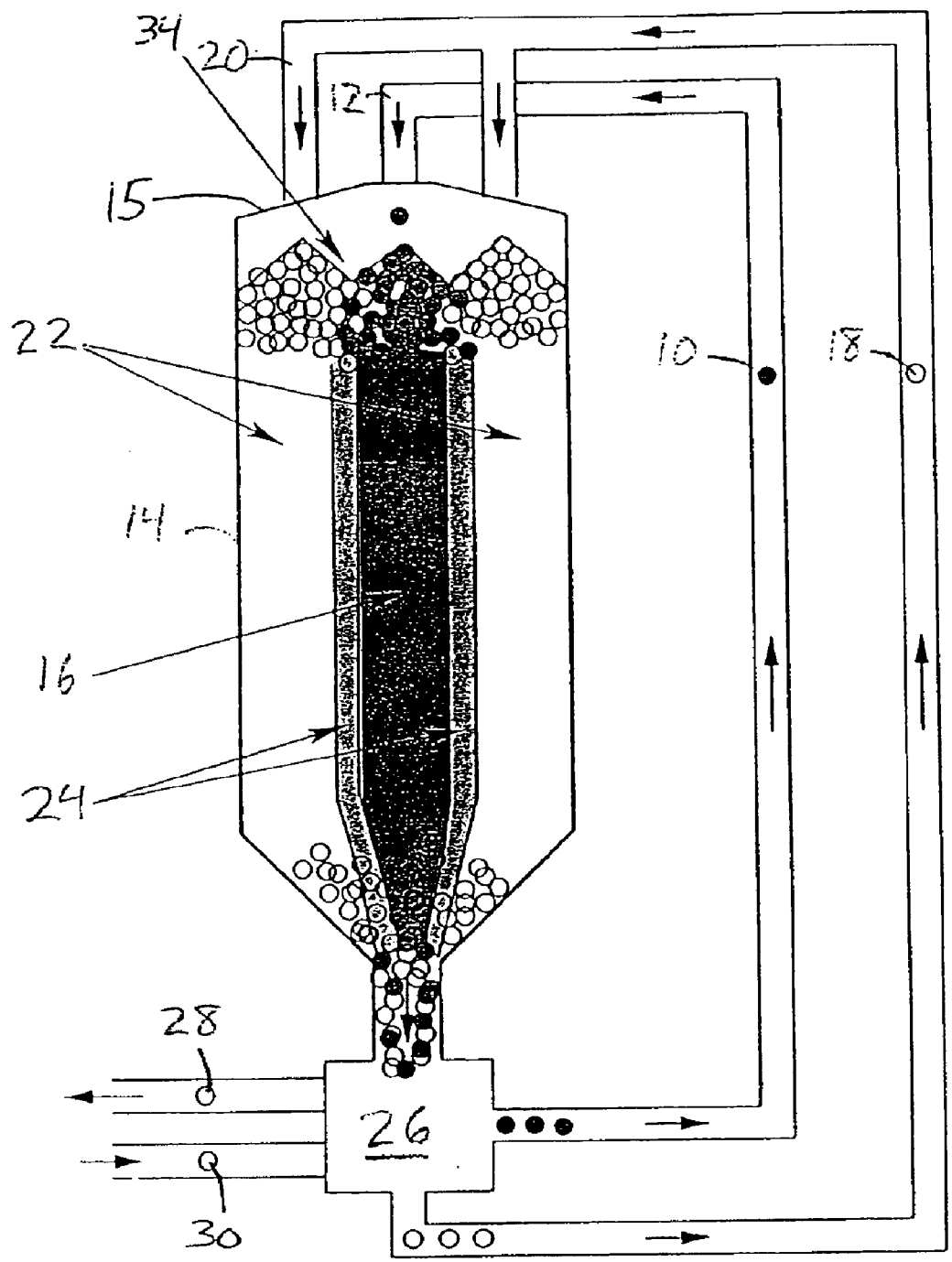
FIG. 1 is a partially schematic diagram of an existing design for a pebble-bed nuclear reactor, showing different regions of the reactor core, including a mixing column of reflector pebbles and fuel pebbles.
Figure 2:
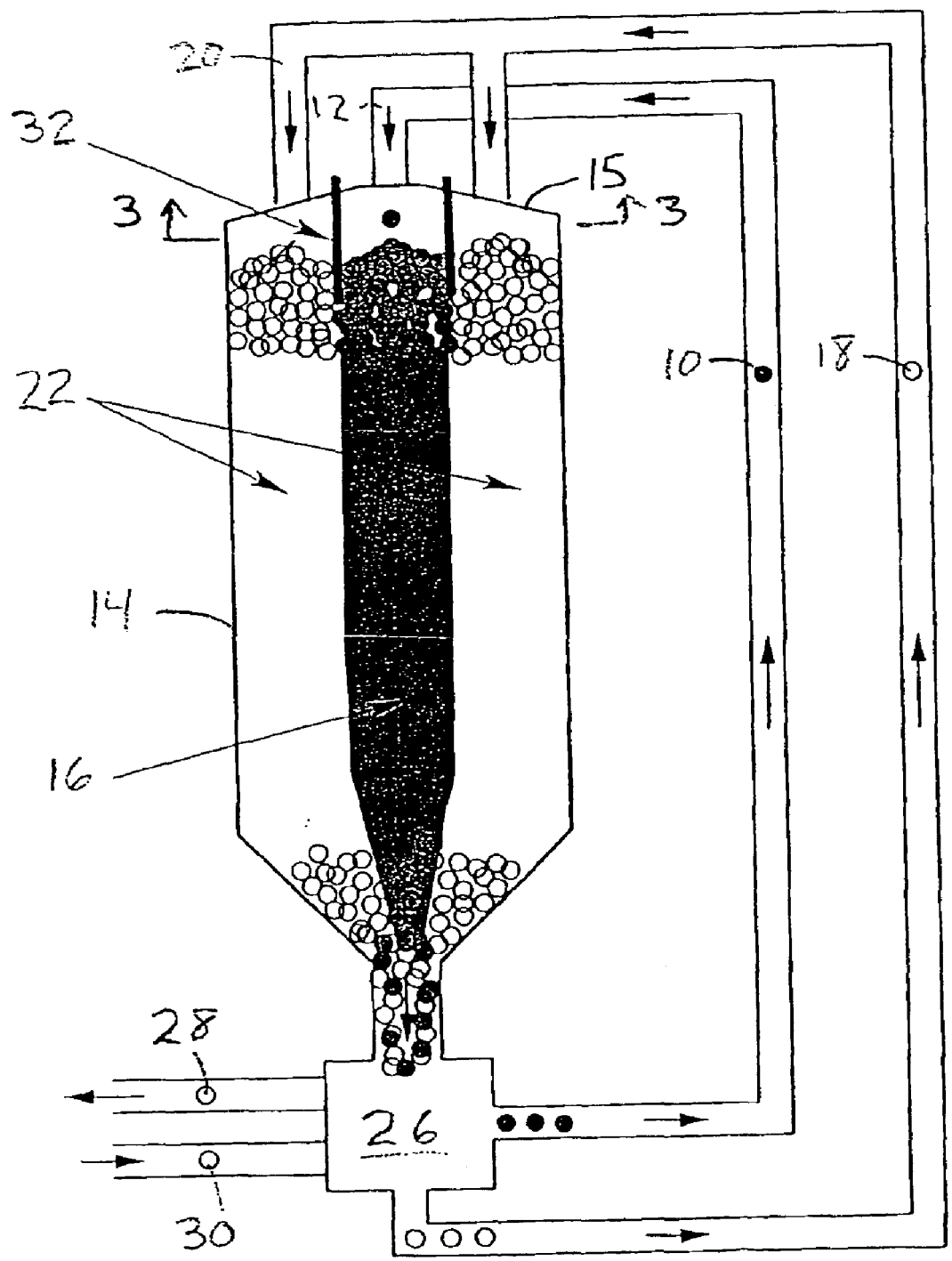
FIG. 2 is a partially schematic diagram of a new design for a pebble-bed nuclear reactor including a guide ring extending slightly below the free surface of the pebble bed in the reactor core vessel; the guide ring suppresses surface mixing in the reactor core vessel, which reduces or eliminates the annular mixed column in the core vessel.

The foregoing and other features and advantages will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

The power system of a modular pebble bed reactor includes a reactor, where thermal energy is generated by a nuclear reaction, and a power conversion unit, where the thermal energy is converted to mechanical work and then to electrical energy by a thermodynamic cycle and a generator. A fluid (particularly a gas, such as helium) is passed through the system, extracting the nuclear-generated heat from the pebble bed and delivering that heat to the power conversion unit, where the gas further serves as the working fluid. Helium is particularly suitable as the heat-transfer medium because of its chemical inertness, its phase stability through normal operating changes in a reactor, and its small nuclear-absorption cross section.

Figure 3:
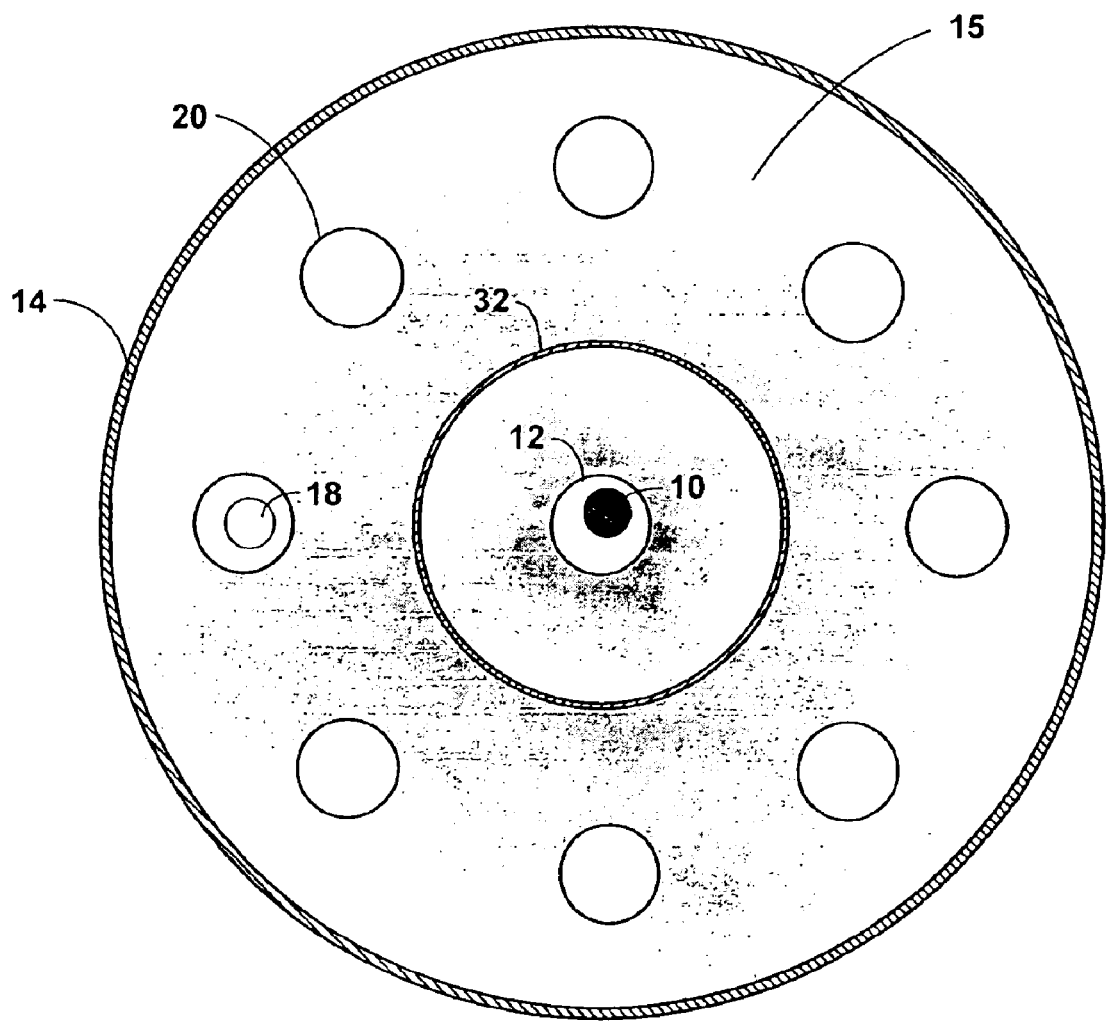
FIG. 3 is a sectional view upward from plane 3—3 of the reactor illustrated in FIG. 2; the sectional view illustrates the output of the conduits through which the pebbles are dropped and the guide ring.
Figure 4:
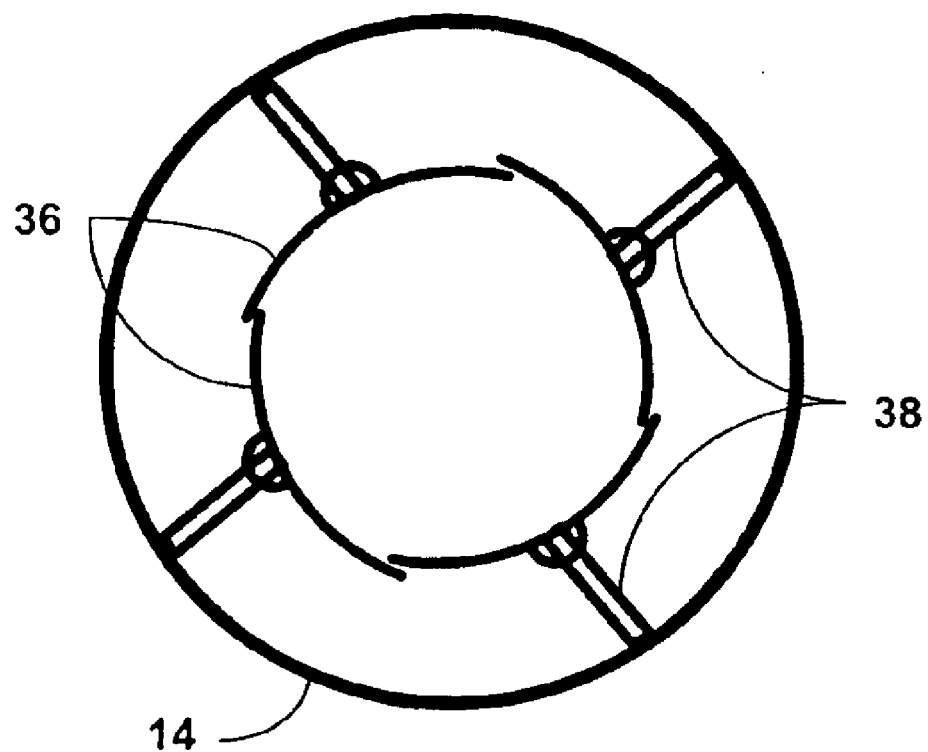
FIG. 4 is a sectional view of an adjustable guide ring.

A simple way to prevent the mixing of reflector and fuel pebbles and to precisely control the composition of the core is to add a "guide ring" assembly 32 to the top of the core vessel 14, as shown in FIG. 3. The guide ring 32 can be made of graphite or some other strong, solid, neutron-reflecting material used in other parts of the core, and its inner diameter can be approximately half the diameter of the vessel 14 (e.g., 1.75 m ring inner-diameter for a vessel having an inner diameter of 3.5 m).

The guide ring 32 can be suspended from the ceiling of the core vessel 14 above the desired interface between reflector and fuel pebbles 10, 18 and can extend from the ceiling to a position that is designed to be on average 2–10 pebbles below the evolving free surface on either side (during steady state cycling of the core), although this depth allowance may need to be increased to accommodate larger fluctuations in surface height. Fluctuations in the height of the free surface due to avalanches can be reduced by using more drop holes per unit area of the ceiling, which leads to smaller conical piles and thus smaller avalanche events. Fluctuations in height can also arise from statistical variations in the arrival of different types of pebbles from the sorter. During steady operation, this effect will only cause minor perturbations to the surface height (of the order of a few pebble diameters), since pebbles arrive at the sorter already in the right proportion. Care should be taken, however, to properly adjust the ratio of incoming fuel and reflector pebbles to maintain roughly the same free surface heights when the guide ring width is adjusted.

Alternatively, the guide ring 32 need not extend all the way from the ceiling, though the guide ring 32 preferably extends a sufficient height above the surface of the pebbles 10, 18 to ensure that no pebbles 10, 18 can bounce over the guide ring 32. This height can be determined by assuming that the pebbles on the surface behave as an inelastic solid floor that absorbs some fraction of the kinetic energy when a collision occurs. However, to be sure that no pebbles cross the regions separated by the guide ring, it may be preferable for the guide ring to extend from the ceiling. Another reason for the guide-ring shell to extend into the ceiling is that the alternative of suspending the ring somehow below the ceiling introduces additional structural parts which may interfere with the granular flow or may increase the risk of a mechanical failure or fracture of these parts.

The guide ring 32 in this embodiment is cylindrical and aligned with the axis, though other cross-sectional shapes and alignments are possible.

The guide ring 32 completely blocks avalanches of different kinds of pebbles 10, 18 from mixing at the free surface, but otherwise does not interfere with the bulk granular flow. Pebbles 10, 18 tumbling down the free surface in avalanches settle into randomly packed positions against the wall of the guide ring 32, where they slowly sink into the core as the system drains. Once the pebbles 10, 18 pass the lower edge of the ring 32 (penetrating only a few layers into the core material), a sharp interface is formed. Experiments suggest that the moving interface will have roughness only at the scale of a single pebble, until it converges very close to the lower opening leading to the sorter 26.

In the simplest guide-ring design, a single ring is fixed in place at a position determined in advance by core-physics calculations. Likewise, with the existing PBMR/MBPR design, the core composition is determined by drop-holes at fixed positions that typically cannot be practically changed after the reactor is built. A fixed-guide ring, however, would still have the desirable effect of eliminating the mixed column 24.

One configuration of drop-holes that can be used in the reactor is illustrated in FIG. 3. This configuration includes one centered conduit 12 through which reflector pebbles 10 are fed and eight peripheral conduits 20 through which fuel pebbles 18 are fed from the ceiling 15 of the core vessel 14. The eight conduits 20 for the fuel pebbles 18 are evenly distributed around the periphery of the core. Though, of course, the number and particular positioning of the conduits can be varied.

The utility of the adjustable guide ring for providing dynamic variation of the core composition is desirable for a number of reasons. First, adjustability of the guide ring offers potentially substantial benefits in terms of efficiency and safety. A predetermined fixed design (with or without a guide ring) may not (and generally will not) have optimal position to set the optimal width of the central reflector column, from the perspective of fuel efficiency or safety from power peaking. Since the optimal width of the central column is difficult to predict in advance from mathematical models, it would be preferable to measure fuel efficiency, peak temperatures, or other metrics empirically once the reactor is operating and then adjust the width of the central graphite column as desired until an optimal composition is reached.

Second, the ability to dynamically vary the core composition affords the flexibility to use different types of fuel, with different performance characteristics and limitations. Since the design of fuel pebbles is an area of active research and development, it is likely that a functioning reactor may need to switch its fuel type. Changing the type of fuel also enables one to control the power output of the reactor in response to various economic considerations. With the current PBMR/MPBR design, it may not be possible to adjust the core composition to make optimal use of the new fuel, and also to stay within its possibly different design limitations, e.g. maximum allowable temperature. The adjustable guide ring, however, makes it easy to control the width of the inner column, and hence the composition of the reactor core, on the fly during reactor operation by adjusting the width of the guide ring 32.

If the guide ring extends deep into the core, it is not easily moved radially (to directly expand or contract its diameter) because the granular material acts like a hard solid in the bulk packed region. Near the free surface, however, the guide ring can be moved radially without much hindrance by surface pebbles, which are fairly easily displaced. Obviously, above the free surface, it can be moved radially without any trouble. Thus, the guide ring 32, when it extends no more than a few pebble diameters (e.g., no more than 10) into the core, can be widened or constricted if, e.g., it is made of a set of overlapping guide-ring members 36, here in the form of cylindrical arcs, which can be offset relative to one another (via, e.g., a motorized displacement mechanism 38) to provide varying degrees of overlap and to consequently circumscribe a greater or lesser volume. Note that any such motor mechanism may need to be outside the reactor vessel 14 to avoid the risks of operating in a high-temperature, high-radiation environment.

An even simpler operational approach to changing the guide-ring diameter would be to let the core drain briefly without adding any new pebbles until the free surface height drops near or below the bottom of the guide ring 32 and only then change the diameter of the ring 32. This, however, would require storing some pebbles 10, 18 arriving at the sorter briefly before sending them back into the vessel, which may be impractical in some contexts.

One possible problem with adjusting the width of a guide ring 32 directly may be that such adjustments could perhaps raise the likelihood of a mechanical failure. In a worst-case scenario, this could cause a piece of the guide ring assembly to break off and fall into the core, which would have to be detected and removed to avoid clogging the drain leading to the sorter 26. Although this is a remote possibility with proper engineering, it would still be best to minimize the number of free parts in the reactor vessel 14 that could fracture or otherwise interfere with the granular flow as pebbles are cycled through the core.

Figure 5:
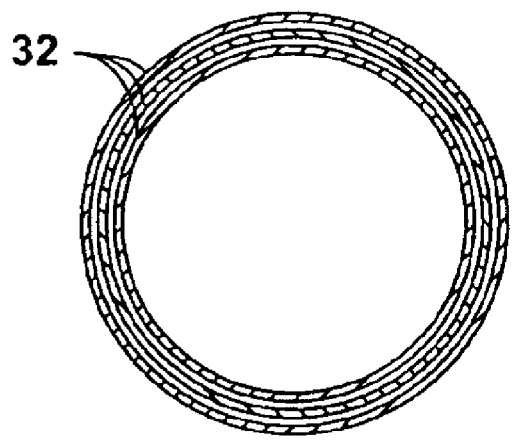
FIG. 5 is a sectional view of a plurality of nested guide rings.

These problems may be reduced, or perhaps completely avoided, with another simple design, in which there is an assembly of nested, cylindrical, fixed-size guide rings 32, as shown in FIG. 5, rather than a single adjustable ring. Each of the rings 32 can be lowered one at a time into the core vessel 14 from the ceiling of the vessel (by a mechanism outside the shielding inner wall of the vessel) to the pre-scribed guide-ring height below the free surface of the pebble bed. The rings 32 can be in a variety of sizes having inner diameters ranging from about one-quarter to about three-quarters the inner diameter of the vessel 14.

Replacement, and thus resizing, of the guide ring at the pebble-bed free surface can be performed in several ways. As in the example above, the core can be drained without refilling while one guide ring 32 is raised and another guide ring 32 is lowered, but this interferes with the normal cycling operation and requires a way of storing some pebbles before reintroducing them into the vessel.

A simpler approach would be to switch from one guide ring to a new one of a different size as follows: (1) While the old guide ring is still fixed in its normal operating position, the new ring is lowered from its storage position in the ceiling until it rests under its own weight on the free surface, at some distance above the normal operating depth; (2) The old ring is raised to its storage position in the ceiling, while adjustments are made for pebbles to begin arriving according to the new composition (ratio of fuel to reflector pebbles), consistent with the desired width for the central column set by the new guide ring. (3) The new ring is allowed to slowly sink into the pebble-bed under its own weight as the core drains, while new pebbles arriving from the drop-holes are blocked from crossing it. (4) The new ring is fixed in place when it sinks to its desired operating height. In this way, the width of the guide ring can be adjusted without interfering with the normal operation of the reactor, aside from any changes needed to modify the ratio of fuel to reflector pebbles in the core vessel.

If the desired change in width of the guide ring is large (a significant percentage of its diameter) and the core composition cannot be quickly modified to the correct ratio of fuel to reflector pebbles, then the method just described may lead to temporary height fluctuations in the region being contracted (either the central graphite column or the outer fuel column), which could conceivably be larger than desired (e.g., to avoid possibly blocking a drop-hole). In that case, very little perturbation of the surface height can be achieved by simply repeating this process for a sequence of closely nested rings, whose diameters may differ by as little as one or two pebble diameters, with concomitant small changes in the fuel to reflector pebble ratio. Since it may also be desirable to make adjustments in composition gradually for other reasons (e.g., to see the effect of the new composition on fuel efficiency), this would most likely be normal operational procedure to change the width of the guide-ring.

While this invention has been shown and described with references to particular embodiments thereof, those skilled in the art will understand that various changes in form and details may be made therein without departing from the scope of the invention, which is limited only by the following claims.

What is claimed is:

1. A pebble-bed nuclear reactor comprising:
a reactor core vessel suited for containing radioactive fuel pebbles;
a guide ring mounted within the reactor core vessel and defining an inner volume within the ring and an outer annular volume outside the guide ring;
a column of flowable reflector pebbles that are essentially free of fissionable radioactive material, wherein the reflector-pebble column extends beneath the inner volume defined by the guide ring;
a column of flowable radioactive fuel pebbles containing fissionable radioactive material, wherein the fuel-pebble column extends beneath the outer annular volume defined by the guide ring, and surrounds and contacts the column of flowable reflector pebbles beneath the guide ring along an inner, vertically extending, annular surface of the fuel-pebble column, the guide ring extending within the vessel to provide an outer surface that fuel pebbles at a free surface atop the fuel-pebble column can contact and an inner surface that reflector pebbles at a free surface atop the reflector-pebble column can contact;
at least one reflector-pebble conduit containing one or more of the reflector pebbles, wherein the reflector-pebble conduit includes an outlet above the column of reflector pebbles, enabling reflector pebbles that pass through the outlet to be guided through the inner volume defined by the guide ring to the column of reflector pebbles, and the reflector-pebble conduit defining at least a portion of a passage extending from a bottom end of the reactor core vessel to the outlet of the reflector-pebble conduit so as to enable reflector pebbles that exit from the bottom end of the reactor core vessel to flow through the reflector-pebble conduit and through the guide ring to the top of the reflector-pebble column; and
at least one fuel-pebble conduit containing one or more of the fuel pebbles, wherein the fuel-pebble conduit includes an outlet at a position above the column of fuel pebbles, enabling fuel pebbles that pass through the outlet to be guided through the outer annular volume outside the guide ring to the column of fuel pebbles, and the fuel-pebble conduit defining at least a portion of a passage extending from a bottom end of the reactor core vessel so as to enable fuel pebbles that exit from the bottom end of the reactor core vessel to flow through the fuel-pebble conduit to the top of the fuel-pebble column.

2. The pebble-bed nuclear reactor of claim 1, wherein a plurality of fuel-pebble conduits are positioned to feed fuel pebbles into the reactor core vessel.

3. The pebble-bed nuclear reactor of claim 1, further comprising a sorter for separating fuel pebbles from reflector pebbles, the sorter mounted at an end of the reactor core vessel opposite from where the conduits feed the pebbles into the reactor vessel.

4. The pebble-bed nuclear reactor of claim 1, wherein the guide ring is adjustable to provide a variable cross-sectional area so as to allow for variability in the relative volumes of fuel pebbles and reflector pebbles segregated by the guide ring.

5. The pebble-bed nuclear reactor of claim 4, wherein the guide ring comprises a plurality of members that jointly define a zone, the members being displaceable relative to one another to change the area of the cross-section of the zone.

6. The pebble-bed nuclear reactor of claim 5, wherein the pebble-bed nuclear reactor further comprises a mechanism coupled with the plurality of guide ring members for displacing the plurality of guide ring members relative to one another.

7. The pebble-bed nuclear reactor of claim 1, wherein a plurality of guide rings are nested relative to one another and extendable into the reactor core vessel.

8. The pebble-bed nuclear reactor of claim 7, wherein the guide rings are cylindrical.

9. The pebble-bed nuclear reactor of claim 8, wherein the nested guide rings have inner diameters in the range from about one-quarter to about three-quarters of the inner diameter of the vessel.

10. The pebble-bed nuclear reactor of claim 8, wherein the nested guide rings have inner diameters in the range from about 80 to about 260 cm.

11. The pebble-bed nuclear reactor of claim 1, wherein the guide ring is approximately cylindrical.

12. The pebble-bed nuclear reactor of claim 11, wherein the guide ring has an inner diameter of about half the vessel's inner diameter.

13. The pebble-bed nuclear reactor of claim 11, wherein the guide ring has an inner diameter of about 1.75 m.

14. The pebble-bed nuclear reactor of claim 1, wherein the reflector pebbles comprise graphite.

15. The pebble-bed nuclear reactor of claim 1, wherein the fissionable radioactive material comprises uranium.

16. The pebble-bed nuclear reactor of claim 15, wherein the uranium is in the form of uranium-oxide microspheres.

17. A pebble-bed nuclear reactor comprising:
a reactor core vessel suited for containing radioactive fuel pebbles;
a guide ring mounted within the reactor core vessel and defining an inner volume within the ring and an outer annular volume outside the guide ring;
a column of flowable graphite reflector pebbles, wherein the reflector-pebble column extends beneath the inner volume defined by the guide ring;
a column of flowable radioactive fuel pebbles containing fissionable radioactive material, wherein the fuel-pebble column extends beneath the outer annular volume defined by the guide ring, and surrounds and contacts the column of flowable reflector pebbles beneath the guide ring along an inner, vertically extending, annular surface of the fuel-pebble column, the guide ring extending within the vessel to provide an outer surface that fuel pebbles at a free surface atop the fuel-pebble column can contact and an inner surface that reflector pebbles at a free surface atop the reflector-pebble column can contact;
at least one reflector-pebble conduit containing one or more of the reflector pebbles, wherein the reflector-pebble conduit includes an outlet above the column of reflector pebbles, enabling reflector pebbles that pass through the outlet to be guided through the inner volume defined by the guide ring to the column of reflector pebbles, and the reflector-pebble conduit defining at least a portion of a passage extending from a bottom end of the reactor core vessel to the outlet of the reflector-pebble conduit so as to enable reflector pebbles that exit from the bottom end of the reactor core vessel to flow through the reflector-pebble conduit and through the guide ring to the top of the reflector-pebble column; and at least one fuel-pebble conduit containing one or more of the fuel pebbles, wherein the fuel-pebble conduit includes an outlet at a position above the column of fuel pebbles, enabling fuel pebbles that pass through the outlet to be guided through the outer annular volume outside the guide ring to the column of fuel pebbles, and the fuel-pebble conduit defining at least a portion of a passage extending from a bottom end of the reactor core vessel so as to enable fuel pebbles that exit from the bottom end of the reactor core vessel to flow through the fuel-pebble conduit to the top of the fuel-pebble column.

18. A pebble-bed nuclear reactor comprising:

a reactor core vessel suited for containing radioactive fuel pebbles;

a guide ring mounted within the reactor core vessel and defining an inner volume within the ring and an outer annular volume outside the guide ring;

a column of flowable reflector pebbles that serve to reflect and slow released neutrons without undergoing fission, wherein the reflector-pebble column extends beneath the inner volume defined by the guide ring;

a column of flowable radioactive fuel pebbles containing fissionable radioactive material, wherein the fuel-pebble column extends beneath the outer annular volume defined by the guide ring, and surrounds and contacts the column of flowable reflector pebbles beneath the guide ring along an inner, vertically extending, annular surface of the fuel-pebble column, the guide ring extending within the vessel to provide an outer surface that fuel pebbles at a free surface atop the fuel-pebble column can contact and an inner surface that reflector pebbles at a free surface atop the reflector-pebble column can contact;

at least one reflector-pebble conduit containing one or more of the reflector pebbles, wherein the reflector-pebble conduit includes an outlet above the column of reflector pebbles, enabling reflector pebbles that pass through the outlet to be guided through the inner volume defined by the guide ring to the column of reflector pebbles, and the reflector-pebble conduit defining at least a portion of a passage extending from a bottom end of the reactor core vessel to the outlet of the reflector-pebble conduit so as to enable reflector pebbles that exit from the bottom end of the reactor core vessel to flow through the reflector-pebble conduit and through the guide ring to the top of the reflector-pebble column; and at least one fuel-pebble conduit containing one or more of the fuel pebbles, wherein the fuel-pebble conduit includes an outlet at a position above the column of fuel pebbles, enabling fuel pebbles that pass through the outlet to be guided through the outer annular volume outside the guide ring to the column of fuel pebbles, and the fuel-pebble conduit defining at least a portion of a passage extending from a bottom end of the reactor core vessel so as to enable fuel pebbles that exit from the bottom end of the reactor core vessel to flow through the fuel-pebble conduit to the top of the fuel-pebble column.

* * * * *

UNITED STATES PATENT AND TRADEMARK OFFICE
CERTIFICATE OF CORRECTION

| | | |
|---|---|---|
| PATENT NO. | : 6,865,245 B2 | Page 1 of 1 |
| APPLICATION NO. | : 10/264098 | |
| DATED | : March 8, 2005 | |
| INVENTOR(S) | : Bazant | |

It is certified that error appears in the above-identified patent and that said Letters Patent is hereby corrected as shown below:

IN THE SPECIFICATION:

Column 1, line 5 insert as follows:

--This invention was made with government support under Grant No. F19628-00-C-0002, awarded by the US Air Force. The government has certain rights in this invention.--

Signed and Sealed this
Nineteenth Day of April, 2011

David J. Kappos
*Director of the United States Patent and Trademark Office*